C. P. CASS.
CAR DOOR CONTROLLING DEVICE.
APPLICATION FILED DEC. 3, 1918.
1,317,549.  Patented Sept. 30, 1919.
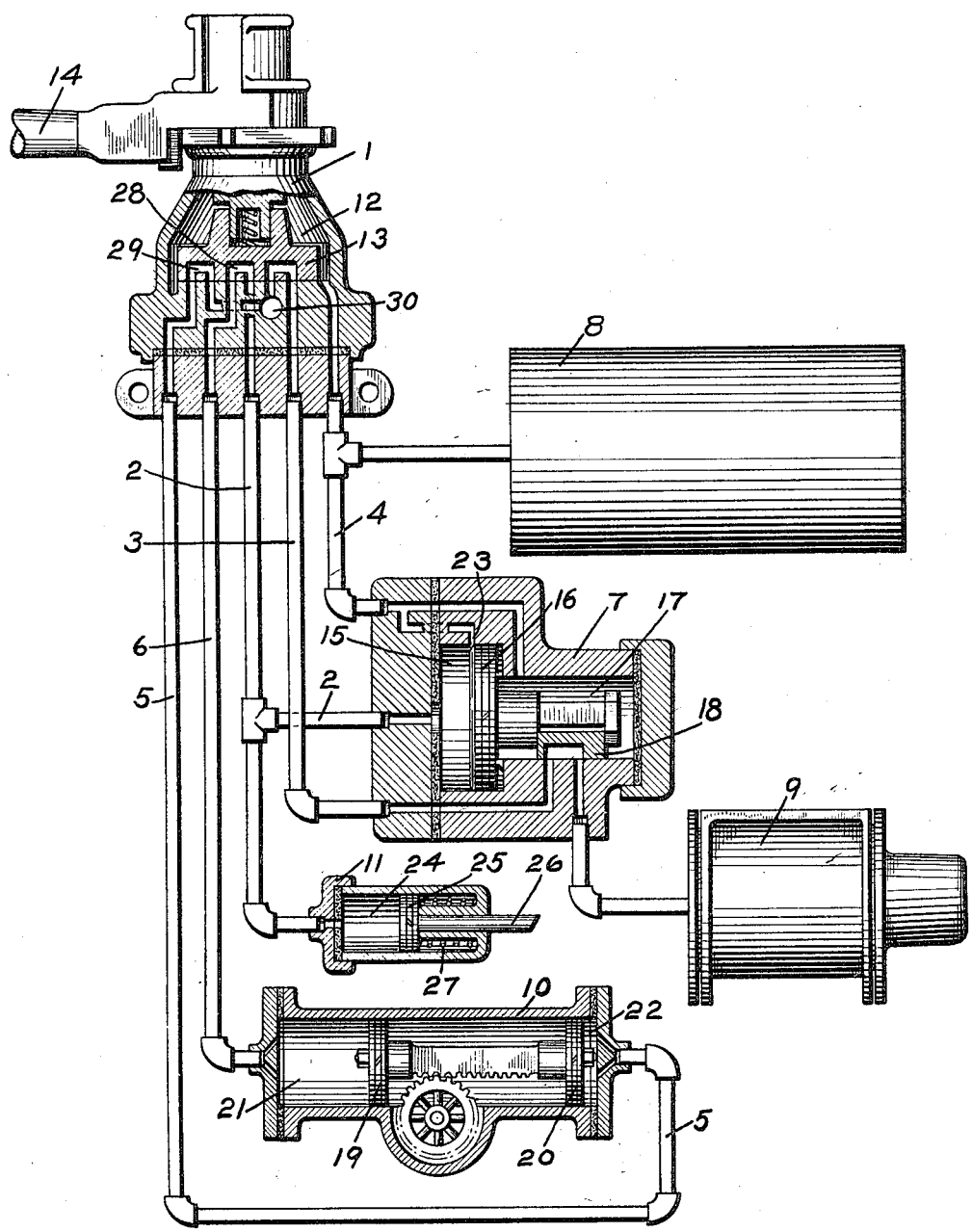
INVENTOR
Christopher P. Cass
by Wm. M. Cady
Att'y.

UNITED STATES PATENT OFFICE.

CHRISTOPHER P. CASS, OF MAPLEWOOD, MISSOURI, ASSIGNOR TO THE WESTINGHOUSE AIR BRAKE COMPANY, OF WILMERDING, PENNSYLVANIA, A CORPORATION OF PENNSYLVANIA.

CAR-DOOR-CONTROLLING DEVICE.

1,317,549.

Specification of Letters Patent. Patented Sept. 30, 1919.

Application filed December 3, 1918. Serial No. 265,167.

*To all whom it may concern:*

Be it known that I, CHRISTOPHER P. CASS, a citizen of the United States, residing at Maplewood, in the county of St. Louis and State of Missouri, have invented new and useful Improvements in Car-Door-Controlling Devices, of which the following is a specification.

This invention relates to car door controlling devices and has for its object to provide means whereby the doors may be opened in case of an emergency.

In the accompanying drawing, the single figure is a diagrammatic view of a car air brake and door controlling equipment with my improvement embodied therein.

As shown in the drawing, the equipment may comprise a brake valve device 1, connected to an emergency brake pipe 2, a straight air pipe 3, a main reservoir pipe 4, and door controlling pipes 5 and 6, an emergency valve device 7, a main reservoir 8, a brake cylinder 9, a door motor 10, and a door latch operating device 11.

The brake valve device 1 may comprise a casing, having a valve chamber 12, containing a rotary valve 13, adapted to be operated by a handle 14.

The emergency valve device 7 may comprise a casing, having a piston chamber 15, connected to brake pipe 2 and containing a piston 16, and having a valve chamber 17, connected to main reservoir pipe 4, and containing a slide valve 18.

The door motor 10 may comprise a cylinder containing operatively connected pistons 19 and 20 for controlling the car doors, the piston chamber 21 adjacent to piston 19 being connected to door opening pipe 6, while the piston chamber 22 adjacent to piston 20 is connected to door closing pipe 5.

The door latch operating device 11 may comprise a cylinder having a piston chamber 24, connected to emergency brake pipe 2, and containing a piston 25 for operating a door latch 26.

The door latch 26 controls an emergency door usually arranged at the rear of the car and normally kept closed except in case of an emergency, while the door motor 10 controls the doors of the car which are normally used for the entrance and exit of passengers.

In operation, the valve chamber 12 of the emergency valve device 7 is charged through pipe 4 with fluid under pressure from the main reservoir 8, and piston chamber 15 and the emergency brake pipe 2 are also charged through a restricted port 23 from the main reservoir pipe 4.

The emergency brake pipe being also connected to piston chamber 24 of the door latch controlling device 11, the piston 25 is normally held outwardly against the resistance of spring 27 by emergency brake pipe pressure, thus causing the latch 26 to operate so as to prevent the opening of the emergency door.

The door opening pipe 6 leading to piston chamber 21 of the door motor 10 is connected, through cavity 28 in the rotary valve 13 with the emergency brake pipe 2, while the door closing pipe 5, leading to piston chamber 22 is connected, through cavity 29 with an exhaust port 30, so that the emergency brake pipe pressure acting on the piston 19 of the door motor normally holds the car doors closed.

If any emergency reduction in brake pipe pressure occurs by breakage of the emergency brake pipe 2 or otherwise, then the piston 16 of the emergency valve device 7 will be operated to open communication for supplying fluid from valve chamber 17 and the main reservoir to the brake cylinder 9, to effect an emergency application of the brakes.

At the same time, since the emergency brake pipe 2 is connected to the door latch operating device 11, the reduction in emergency brake pipe pressure will permit the spring 27 to shift piston 25, so as to retract the door latch 26 and thus permit the emergency door to be opened.

Similarly, the fluid pressure in piston chamber 21 of the door motor 10 is vented with the reduction in brake pipe pressure, so that atmospheric pressure is present in both the piston chambers 21 and 22, and consequently the doors controlled by the door motor 10 may now be opened.

Having now described my invention, what I claim as new, and desire to secure by Letters Patent is:—

1. The combination with an emergency brake pipe, a reduction in pressure in which is adapted to effect an emergency application of the brakes, of means operated by emergency brake pipe pressure for normally preventing the opening of an emergency door, and adapted upon a reduction in emergency brake pipe pressure to permit the door to be opened.

2. The combination with an emergency brake pipe, a reduction in pressure in which is adapted to effect an emergency application of the brakes, of an emergency door latch for holding an emergency door closed and a piston operated by emergency brake pipe pressure for preventing the release of the door latch, said piston being movable upon a reduction in brake pipe pressure to effect the release of the door latch.

3. The combination with an emergency brake pipe, a reduction in pressure in which is adapted to effect an emergency application of the brakes, of a door motor for controlling the opening and closing of car doors and a door latch controlling device for controlling an emergency door, said motor and door latch controlling device being normally subject to emergency brake pipe pressure for preventing the opening of the car doors.

In testimony whereof I have hereunto set my hand.

CHRISTOPHER P. CASS.

Copies of this patent may be obtained for five cents each, by addressing the "Commissioner of Patents, Washington, D. C."